United States Patent
Yu et al.

(10) Patent No.: US 11,208,186 B2
(45) Date of Patent: Dec. 28, 2021

(54) WATER-AIR AMPHIBIOUS CROSS-MEDIUM BIO-ROBOTIC FLYING FISH

(71) Applicant: INSTITUTE OF AUTOMATION, CHINESE ACADEMY OF SCIENCES, Beijing (CN)

(72) Inventors: Junzhi Yu, Beijing (CN); Zhengxing Wu, Beijing (CN); Di Chen, Beijing (CN); Min Tan, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/279,099

(22) PCT Filed: Apr. 16, 2020

(86) PCT No.: PCT/CN2020/085042
§ 371 (c)(1),
(2) Date: Mar. 24, 2021

(87) PCT Pub. No.: WO2021/004110
PCT Pub. Date: Jan. 14, 2021

(65) Prior Publication Data
US 2021/0354800 A1   Nov. 18, 2021

(30) Foreign Application Priority Data

Jul. 10, 2019 (CN) .......................... 201910617884.8

(51) Int. Cl.
B63H 1/36   (2006.01)
B64C 35/00  (2006.01)
(Continued)

(52) U.S. Cl.
CPC ............. *B63H 1/36* (2013.01); *B64C 35/005* (2013.01); *B64C 39/024* (2013.01); *B63G 2008/005* (2013.01); *B64C 2201/025* (2013.01)

(58) Field of Classification Search
CPC ... B63H 1/30; B63H 1/32; B63H 1/36; B63H 1/37; B63G 8/001; B63G 2008/002;
(Continued)

(56) References Cited

U.S. PATENT DOCUMENTS

| | | | | |
|---|---|---|---|---|
| 920,792 | A | * | 5/1909 | Uherkocz ............... B64C 33/02 244/22 |
| 1,031,807 | A | * | 7/1912 | Molnar ................... B64C 33/02 244/72 |

(Continued)

FOREIGN PATENT DOCUMENTS

| CN | 2868840 Y | 2/2007 |
|---|---|---|
| CN | 104589938 A | 5/2015 |

(Continued)

*Primary Examiner* — Ajay Vasudeva
(74) *Attorney, Agent, or Firm* — Bayrameglu Law Offices LLC

(57) ABSTRACT

A water-air amphibious cross-medium bio-robotic flying fish includes a body, pitching pectoral fins, variable-structure pectoral fins, a caudal propulsion module, a sensor module and a controller. The caudal propulsion module is controlled to achieve underwater fish-like body-caudal fin (BCF) propulsion, and the variable-structure pectoral fins is adjusted to achieve air gliding and fast splash-down diving motions of the bio-robotic flying fish. The coordination between the caudal propulsion module and the pitching pectoral fins is controlled to achieve the motion of leaping out of water during water-air cross-medium transition. The ambient environment is detected by the sensor module, and the motion mode of the bio-robotic flying fish is controlled by the controller.

10 Claims, 4 Drawing Sheets

(51) Int. Cl.
*B64C 39/02* (2006.01)
*B63G 8/00* (2006.01)

(58) Field of Classification Search
CPC ........ B63G 2008/004; B63G 2008/005; B64C 33/00; B64C 33/02; B64C 33/025; B64C 2201/025; B64C 35/005; B64C 35/006; B64C 35/007; B64C 39/005; B64C 39/024; B60F 5/02
See application file for complete search history.

(56) References Cited

U.S. PATENT DOCUMENTS

| | | | |
|---|---|---|---|
| 1,776,700 A | | 9/1930 | Pegna |
| 2,021,627 A | * | 11/1935 | Gilpin ..................... B64C 33/02 244/22 |
| 3,806,277 A | * | 4/1974 | Hill ......................... B64C 33/02 416/132 R |
| 10,017,248 B2 | * | 7/2018 | Samuel ................. B64C 39/024 |
| 10,935,986 B1 | * | 3/2021 | Yu ......................... G05D 1/0692 |
| 11,161,578 B2 | * | 11/2021 | Wu ........................... B63G 8/08 |
| 2020/0115018 A1 | * | 4/2020 | Aukes ...................... B25J 11/00 |

FOREIGN PATENT DOCUMENTS

| | | |
|---|---|---|
| CN | 104627342 A | 5/2015 |
| CN | 105922831 A | 9/2016 |
| CN | 106005323 A | 10/2016 |
| CN | 106005337 A | 10/2016 |
| CN | 109733601 A | 5/2019 |
| CN | 110239712 A | 9/2019 |
| DE | 4303619 A1 | 8/1994 |

\* cited by examiner

WATER-AIR AMPHIBIOUS CROSS-MEDIUM BIO-ROBOTIC FLYING FISH

CROSS REFERENCE TO THE RELATED APPLICATIONS

This application is the national phase entry of International Application No. PCT/CN2020/085042, filed on Apr. 16, 2020, which is based upon and claims priority to Chinese Patent Application No. 201910617884.8, filed on Jul. 10, 2019, the entire contents of which are incorporated herein by reference.

TECHNICAL FIELD

The present invention relates to the field of water-air amphibious cross-medium robots, and in particular to a water-air amphibious cross-medium bio-robotic flying fish.

BACKGROUND

A water-air amphibious cross-medium robot is an integrated sea-air robot that can operate both in the air and water. It can move through water and air and can move during the transition between these two different fluid media. The water-air amphibious cross-medium robot combines the strong concealment of underwater vehicles and the high maneuverability of aerial vehicles. It has broad application prospects in military fields such as maritime reconnaissance, surveillance and communication relay and civil fields such as marine search and rescue, ecological and environmental monitoring, and marine resource exploration.

Researchers have carried out lots of exploration and research. At present, the water-air amphibious cross-medium robots are in the conceptual stages of design, including key technology/function verification and prototype production. There are few prototypes, and most of the robots rely on a propeller to achieve the transition between water and air. They have the disadvantages of poor underwater motion performance, large disturbance, low propulsion efficiency and long cross-medium transition time, causing much inconvenience to the implementation of water-air cross-medium tasks. In view of the high requirements of the water-air cross-medium tasks for the transition process, it is necessary to propose a new technical solution to achieve fast and efficient water-air cross-medium transition of the cross-medium vehicles.

A flying fish is a marine fish that can swim quickly in the water with high maneuverability and leap out of the water to glide in the air. It has superb motion skills. Under the water, the flying fish closes its foldable pectoral fins to the sides of the body to reduce resistance, relies on the tail end and caudal fin of the body for rapid propulsion, and can leap out of the water at a speed of 10 m/s (about 20-40 times the body length per second). Once the body is out of the water, the flying fish unfolds its pectoral fins and continues to flap the lower part of the caudal fin in the water at a swing frequency of up to 35 Hz, so as to accelerate its running on the water surface. Finally, when the flying fish reaches a speed of nearly 20 m/s, it completely leaps out of the water. Then, it starts to glide in the air, with a distance up to 50 m. When gliding to the surface of the water, the flying fish again immerses its caudal fin in the water, and swings quickly to accelerate its running on the surface of the water so as to achieve continuous gliding. Through these superb motion skills not possessed by other fishes, the flying fish can effectively avoid predators and improve motion efficiency.

The excellent water-air amphibious cross-medium motion ability of the flying fish has attracted widespread attention from researchers in the field of bionic robots. They tried to apply the flying fish's efficient cross-medium motion mechanism to the bionic robot, so as to develop a water-air amphibious cross-medium robot with excellent motion performance. Compared with the propeller-propelled cross-medium vehicle, the bio-robotic flying fish adopts a fish-like swing-tail bionic propulsion mode, which features high efficiency, high maneuverability and low disturbance. This propulsion mode provides the bio-robotic flying fish with better underwater motion performance and makes it more suitable for monitoring, search and rescue operations in a narrow and complex underwater environment. Besides, the bio-robotic flying fish leaps out of the water by high-speed swimming for gliding motion, which enables the fast water-air cross-medium transition, energy conservation and efficient navigation. In recent years, many research institutions have carried out research on the bio-robotic flying fish, but they have not developed a bio-robotic flying fish prototype that relies on caudal propulsion to achieve water-air amphibious cross-medium motion.

The bio-robotic flying fish leaps out of the water through swing-tail propulsion to achieve water-air amphibious cross-medium motion. This process requires a fast swimming speed, and therefore a driving mechanism with large propulsion forces. Both the gliding distance and speed of leaping out of water are closely related to its body length and mass. Therefore, it is necessary to design a new propulsion system with a high power density (small size, light weight and high power). To achieve the high-speed underwater swimming and air gliding of the bio-robotic flying fish, it is necessary to design a new variable-structure pectoral fin mechanism based on the structural compatibility requirements of the navigation in different media. Through the new variable-structure pectoral fin mechanism, the pectoral fins are tightly attached to both sides of the body in the water to reduce resistance and achieve fast swimming, are unfolded in the air to provide lift for long-distance gliding, and meet the structural strength requirement for diving into water.

Overall, the biological flying fish achieves fast swimming through variable-structure pectoral fins and swing-tail propulsion to further achieve water-air amphibious cross-medium motion, and achieves energy-saving gliding in the air through the variable-structure pectoral fins. Inspired by this, the present invention introduces the flying fish's efficient cross-medium motion mechanism to the bio-robotic flying fish, so that it has the ability of water-air amphibious cross-medium motion, that is, high-speed, high-maneuverability swimming in the water and gliding in the air. The present invention effectively solves the problems of poor underwater motion performance, large disturbance, low propulsion efficiency and long cross-medium transition time in the prior art.

SUMMARY

The present invention aims to solve the problems of poor underwater motion performance, large disturbance, low propulsion efficiency and long water-air cross-medium transition time of the water-air amphibious cross-medium robot.

In order to solve these problems in the prior art, an embodiment of the present invention provides a water-air amphibious cross-medium bio-robotic flying fish. The water-air amphibious cross-medium bio-robotic flying fish includes a body, pitching pectoral fins, variable-structure pectoral fins, a caudal propulsion module, a sensor module, and a controller.

There are two pitching pectoral fins. The two pitching pectoral fins are symmetrically arranged on left and right sides of the body. The pitching pectoral fins are rotatably mounted on the body around a left-right axis under the drive of a first power device.

There are two variable-structure pectoral fins. The two variable-structure pectoral fins are symmetrically arranged on the left and right sides of the body. The variable-structure pectoral fins are foldably mounted on the body along a front-back direction under the drive of a second power device.

The caudal propulsion module is mounted at the rear of the water-air amphibious cross-medium bio-robotic flying fish.

The sensor module is mounted on the body, and is configured to detect at least one of the following: an attitude of the body, a rotation angle of the pitching pectoral fins, a depth of the bio-robotic flying fish in a water environment and a gliding height thereof in the air, an unfolded/folded state of the variable-structure pectoral fins, a swing frequency of the caudal propulsion module and an ambient environment of the body; and a signal output terminal of the sensor module, a control terminal of the first power device, a control terminal of the second power device and a control terminal of a third power device are respectively signal-connected to the controller.

In some preferred embodiments, the first power device drives the pitching pectoral fins to rotate through a first transmission mechanism. The first transmission mechanism includes a driving gear, a driven gear, a bearing and a first transmission shaft. A power output terminal of the first power device is in transmission connection with the driving gear. The driving gear and the driven gear are rotatably mounted on the body and are meshed. The first transmission shaft and the driven gear are coaxially fixedly connected. The first transmission shaft is rotatably mounted on the body through the bearing. Both ends of the first transmission shaft are respectively fixedly connected to the pitching pectoral fins.

In some preferred embodiments, the variable-structure pectoral fins include fin rays and fin membranes. Each of the variable-structure pectoral fins includes a leading edge fin ray and a trailing edge fin ray. The trailing edge fin ray is fixed to the body. The leading edge fin ray is foldably mounted on the body along a front-back direction under the drive of the second power device. Thus, the fin membrane fixed to the leading edge fin ray and the trailing edge fin ray is unfolded or folded to achieve an air gliding motion and a splash-down diving motion of the water-air amphibious cross-medium bio-robotic flying fish.

In some preferred embodiments, each of the variable-structure pectorals fin further includes a second transmission shaft rotatably mounted on the body. The second transmission shaft is in transmission connection with the second power device. The leading edge fin ray is fixedly connected to the second transmission shaft.

The fin rays further include a median fin ray. The median fin ray is provided with a D-shaped hole. The second transmission shaft is provided with a sliding and rotating part in clearance fit with the D-shaped hole. The sliding and rotating part includes a planar zone and a cylindrical zone that are connected and sealed along the second transmission shaft. The sliding and rotating part is provided with an action groove; the action groove penetrates the planar zone and the cylindrical zone.

A connection of the action groove and the cylindrical zone and a connection of the action groove and the planar zone are sequentially arranged along a rotation direction of the second transmission shaft.

An angle of the action groove is equal to an angle between the leading edge fin ray and the median fin ray when the fin membrane is fully unfolded. A line between the connection of the action groove and the planar zone and the connection of the action groove and the cylindrical zone is a first line; an angle of the action groove is an angle between the first line and the planar zone.

In some preferred embodiments, there are two fin membranes. The two fin membranes are symmetrically arranged on the left and right sides of the body. Each of the fin membranes is fixedly connected to the leading edge fin ray, the median fin ray and the trailing edge fin ray.

In some preferred embodiments, the water-air amphibious cross-medium bio-robotic flying fish further includes the caudal propulsion module, an eccentric wheel, and a sliding rail.

The caudal propulsion module includes a caudal drive module and a caudal module.

The caudal drive module includes a third power device and a reduction gearbox. The reduction gearbox is fixedly connected to an output terminal of the third power device; the eccentric wheel is fixedly connected to an output terminal of the reduction gearbox. The third power device drives the reduction gearbox and the eccentric wheel to rotate.

The caudal module includes an active link and a caudal fin. The active link is hinged to the body. The sliding rail is hinged to the active link, and is used to convert unidirectional continuous rotation of an output shaft of the reduction gearbox into left-right reciprocating swing of the active link.

The caudal fin is hinged to the active link. Alternatively, the caudal fin is fixed to the active link.

In some preferred embodiments, the water-air amphibious cross-medium bio-robotic flying fish further includes an action rod. The eccentric wheel is rotatably mounted in a plane perpendicular to a length direction of the water-air amphibious cross-medium bio-robotic flying fish. The action rod is fixed to the eccentric wheel and keeps a distance from a rotation axis of the eccentric wheel.

The sliding rail includes two action parts. The two action parts are symmetrically arranged on the left and right sides of the body; and a distance from a free end of the action rod to the eccentric wheel is greater than a distance from a side of each of two the action parts facing the eccentric wheel to the eccentric wheel.

In some preferred embodiments, the active link includes two action parts. The two action parts are fixedly connected in a V-shape. A limit baffle is provided at a connecting end of the two action parts of the active link; and the limit baffle is used to adjust a maximum swing angle of the caudal fin.

In some preferred embodiments, the water-air amphibious cross-medium bio-robotic flying fish further includes a communication module. The communication module is in communication connection with the outside and is used to send a motion state of the water-air amphibious cross-medium bio-robotic flying fish or receive instructions of different swimming modes sent from the outside.

In some preferred embodiments, the water-air amphibious cross-medium bio-robotic flying fish further includes a waterproof caudal skin. The waterproof caudal skin covers the posterior of body and is used for waterproof sealing of the water-air amphibious cross-medium bio-robotic flying fish.

In some preferred embodiments, the controller controls the rotation of the two pitching pectoral fins, the folding or unfolding of the variable-structure pectoral fins and the swing of the active link to implement three working modes of the water-air amphibious cross-medium bio-robotic flying fish, that is, underwater high-speed and high-maneuverability swimming motion, water-air cross-medium transition motion and air gliding motion.

In the underwater high-speed and high-maneuverability motion mode, the third power device acts as a propulsion mechanism to drive the active link and the caudal fin to make left-right reciprocating swing, so as to provide power for the water-air amphibious cross-medium bio-robotic flying fish to move forwards. A swing frequency of the active link is controlled to adjust a speed of the bio-robotic flying fish moving forwards. The first power device controls, by using the first transmission mechanism, the pitching pectoral fins to move, and controls a pitch angle of the pitching pectoral fins to achieve upward and downward motions in the water, where the variable-structure pectoral fins are folded on both sides of the body.

In the water-air cross-medium transition motion mode, the water-air amphibious cross-medium bio-robotic flying fish leaps out of the water surface by controlling the pitch angle of the pitching pectoral fins and cooperating with the high-frequency swing of the active link. After the variable-structure pectoral fins leave the water surface, the variable-structure pectoral fins are quickly unfolded.

In the air gliding motion mode, after the water-air amphibious cross-medium bio-robotic flying fish leaps out of the water surface, the unfolded variable-structure pectoral fins provide lift to achieve an air gliding motion. An angle of unfolding the variable-structure pectoral fins is controlled to adjust a gliding posture of the bio-robotic flying fish. When the variable-structure pectoral fins are fully folded in the air, a fast splash-down diving motion may be achieved.

The present invention has the following advantages. The bio-robotic flying fish of the present invention can achieve water-air amphibious cross-medium motions, that is, high-speed underwater motion and air gliding motion. The bio-robotic flying fish has an excellent ability to achieve water-air amphibious cross-medium motions of biological flying fish and adapts to the requirements of different tasks by switching between different navigation media. In the water environment, the bio-robotic flying fish swims fast with high maneuverability through swing-tail bionic propulsion, which is suitable for performing tasks in the complex underwater environment. The pitching pectoral fins act as control wings, and their pitch angle can be changed to achieve upward and downward motions of the bio-robotic flying fish in the underwater environment. This method has the advantages of fast adjustment speed, large adjustment range and small space occupation. Through the coordination of the fast caudal propulsion and the pitching pectoral fins of the bio-robotic flying fish, the bio-robotic flying fish can leap out of water to achieve the water-air cross-medium transition, so as to enter the air to perform tasks. In the air, the unfolded variable-structure pectoral fins provide lift for the bio-robotic flying fish to glide, which improves the motion efficiency and is suitable for performing tasks in the air. The present invention adopts a miniaturized and lightweight design in the overall design process, so that the bio-robotic flying fish can more easily achieve the water-air cross-medium transition and reach a longer gliding distance. The present invention effectively solves the problems of poor underwater motion performance, large disturbance, low propulsion efficiency and long cross-medium transition time in the prior art.

DETAILED DESCRIPTION OF THE EMBODIMENTS

Figure 1:
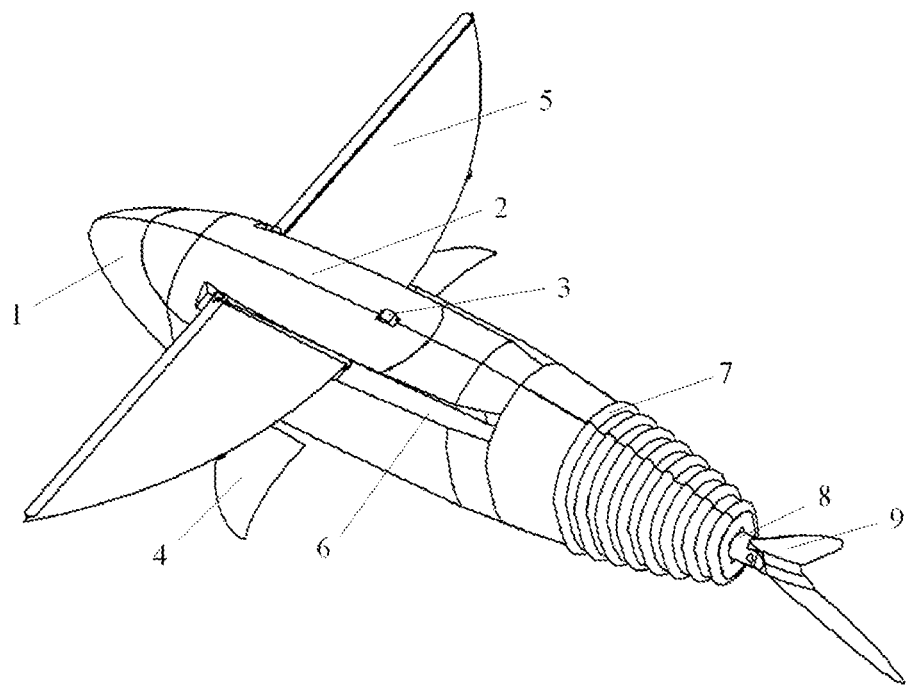
FIG. 1 is a schematic diagram showing an overall structure according to an embodiment of the present invention.

The preferred implementations of the present invention are described below with reference to the accompanying drawings. Those skilled in the art should understand that the implementations herein are merely intended to explain the technical principles of the present invention, rather than to limit the protection scope of the present invention.

An embodiment of the present invention provides a water-air amphibious cross-medium bio-robotic flying fish. The water-air amphibious cross-medium bio-robotic flying fish includes a body, pitching pectoral fins, variable-structure pectoral fins, a caudal propulsion module, a sensor module and a controller.

There are two pitching pectoral fins. The two pitching pectoral fins are symmetrically arranged on left and right sides of the body. The pitching pectoral fins are rotatably mounted on the body around a left-right axis under the drive of a first power device. The first power device provides power for the pitching pectoral fins, and adjusts an upward and downward motion mode of the water-air amphibious cross-medium bio-robotic flying fish by adjusting a pitch angle of the pitching pectoral fins.

There are two variable-structure pectoral fins. The two variable-structure pectoral fins are symmetrically arranged on the left and right sides of the body. The variable-structure pectoral fins are foldably mounted on the body along a front-back direction under the drive of a second power device. The second power device provides power for the variable-structure pectoral fins, and controls the variable-structure pectoral fins to unfold or fold in coordination with a motion state of the bio-robotic flying fish according to different working modes of the bio-robotic flying fish, so as to achieve the optimal working state of the bio-robotic flying fish.

The caudal propulsion module includes a caudal drive module and a caudal module.

The caudal drive module includes a third power device and a reduction gearbox. The reduction gearbox is fixedly connected to an output terminal of the third power device. The eccentric wheel is fixedly connected to an output terminal of the reduction gearbox. The third power device drives the reduction gearbox and the eccentric wheel to rotate. That is, in the present invention, a motor coordinates with the reduction gearbox to provide power for a caudal end of the bio-robotic flying fish, so as to achieve fast swimming in the water.

The caudal module includes an active link and a caudal fin. The active link is hinged to the body. The sliding rail is hinged to the active link, and is used to convert unidirectional continuous rotation of an output shaft of the reduction gearbox into left-right reciprocating swing of the active link.

The caudal fin is hinged to the active link. Alternatively, the caudal fin is fixed to the active link. The caudal fin is mounted on the rear of the body so that it can swing left and right under the drive of the third power device. The third power device provides power for the active link. Under the drive of the third power device, the caudal module achieves different swing frequencies according to different working modes of the robotic flying fish.

The caudal fin is mounted at a tail end of the active link through a rotation shaft. Under an interaction between the active link and a surrounding fluid, the caudal fin passively swings around the shaft quickly to provide thrust for the fast swimming of the bio-robotic flying fish.

The sensor module is mounted on the body, and is configured to detect at least one of the following: an attitude of the body, a rotation angle of the pitching pectoral fins, a depth of the bio-robotic flying fish in a water environment and a gliding height thereof in the air, an unfolded/folded state of the variable-structure pectoral fins, a swing frequency of the active link and an ambient environment of the body. A signal output terminal of the sensor module, a control terminal of the first power device, a control terminal of the second power device and a control terminal of the third power device are respectively signal-connected to the controller. The sensor module is able to detect the motion state of the bio-robotic flying fish. The motion state includes the pitch angle of the pitching pectoral fins of the bio-robotic flying fish, the unfolded/folded state of the variable-structure pectoral fins of the bio-robotic flying fish, the depth of the bio-robotic flying fish in the water environment and the gliding height thereof in the air, the swing frequency of the active link of the bio-robotic flying fish and an external environment state of the bio-robotic flying fish. Based on at least one of the following detected information: the current working mode of the bio-robotic flying fish, the pitch angle of the pitching pectoral fins of the bio-robotic flying fish, the unfolded/folded state of the variable-structure pectoral fins of the bio-robotic flying fish, the depth of the bio-robotic flying fish in the water environment and the gliding height thereof in the air, the swing frequency of the active link of the bio-robotic flying fish and the external environment state of the bio-robotic flying fish, the controller sends an instruction of the working mode to the control terminal of the first power device, the control terminal of the second power device and the control terminal of the third power device, so as to control the bio-robotic flying fish to implement the working mode.

The preferred implementation mode in an embodiment of the present invention is described in more detail below with reference to the accompanying drawings. Referring to FIG. 1, the overall shape of the water-air amphibious cross-medium bio-robotic flying fish of the present invention adopts a streamlined design of a biological flying fish. The water-air amphibious cross-medium bio-robotic flying fish includes the body cabin 1, the top cover 2, the switch 3, the pitching pectoral fins 4, the variable-structure pectoral fins 5, the groove 6, the waterproof caudal skin 7, the caudal peduncle joint 8 and the caudal fin 9. The body cabin 1 is a streamlined shell for placing a mechanical structure and a control system module of the bio-robotic flying fish. The body cabin is provided with the groove 6, and is connected to the top cover 2 by an adhesive material. In the embodiment of the present invention, the body cabin and the top cover are preferably connected by silicone rubber to achieve waterproof sealing. The switch 3 is fixed on the top cover 2 by an adhesive material. In the embodiment of the present invention, the switch is preferably sealed and fixed on the top cover by silicon rubber. The switch is able to perform power-on and power-off operations on the bio-robotic flying fish. There are two pitching pectoral fins 4. The two pitching pectoral fins are symmetrically arranged on left and right sides of the body. The pitching pectoral fins are rotatably mounted on the body around a left-right axis under the drive of a first power device, and are rotated through gear transmission. In the embodiment of the present invention, the first power device refers to a pitching pectoral fin driving servo motor. The variable-structure pectoral fins 5 and the second power device are connected by a transmission shaft to achieve the unfolding and folding functions of the variable-structure pectoral fins 5. There are two variable-structure pectoral fins. The two variable-structure pectoral fins are symmetrically arranged on the left and right sides of the body. The variable-structure pectoral fins are foldably mounted on the body along a front-back direction under the drive of the second power device. In the embodiment of the present invention, the second power device refers to a variable-structure pectoral fin driving servo motor. The groove 6 is used to place the variable-structure pectoral fins 5 after they are folded to reduce resistance of the bio-robotic flying fish swimming in the water. The waterproof caudal skin 7 is connected to the body cabin 1 through silicone rubber to achieve an overall waterproof seal. The caudal fin 9 and the fish body are connected by the caudal peduncle joint 8 to achieve swing of the caudal fin 9.

Figure 2:
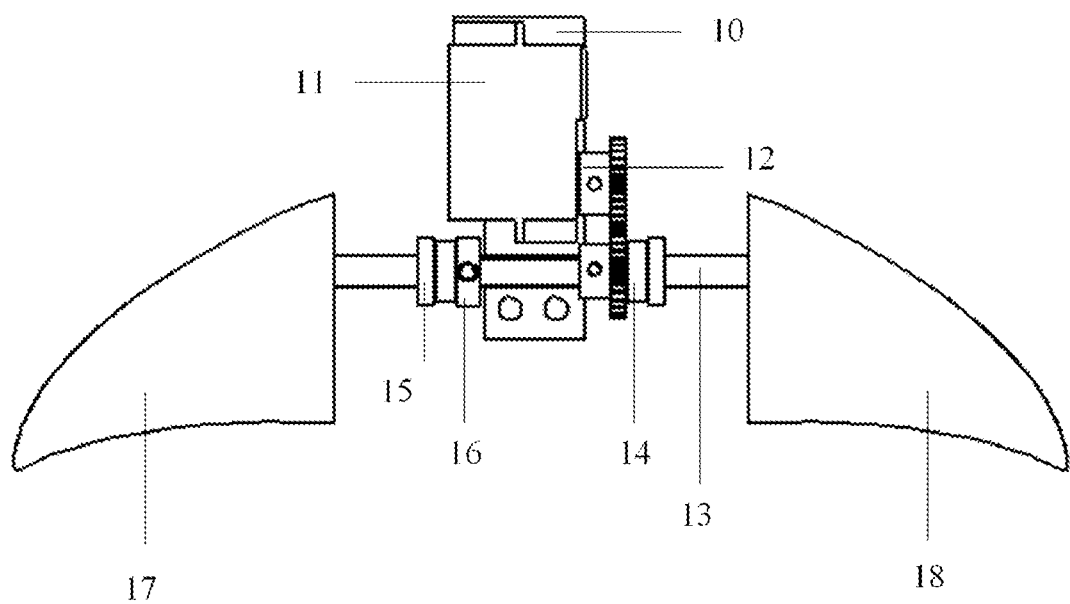
FIG. 2 is a schematic diagram showing a structure of pitching pectoral fins according to an embodiment of the present invention.

Referring to FIG. 2, the body includes a pitching pectoral fin module. The pitching pectoral fin module is composed of the fixing plate 10, the driving servo motor 11, the transmission gear set 12, the first transmission shaft 13, the first bearing 14, the dynamic sealing ring 15, the bearing fixing member 16, the left pectoral fin 17 and the right pectoral fin 18. The fixing plate 10 fixes the driving servo motor 11 in the body. The first power device drives, by using the first transmission mechanism, the pitching pectoral fins to rotate. In the embodiment of the present invention, the first power device is preferably the driving servo motor 11, and the first transmission mechanism is preferably the first transmission shaft 13. In the embodiment of the present invention, the first transmission mechanism preferably includes the transmission gear set 12, the first bearing 14 and the first transmission shaft 13. A power output terminal of the driving servo motor 11 is in transmission connection with a driving gear of the transmission gear set 12. The driving gear and a driven gear are meshed, and are respectively rotatably mounted on the body. The first transmission shaft 13 is coaxially fixedly connected to the driven gear of the transmission gear set. The first transmission shaft 13 and the first bearing 14 are rotatably mounted on the body. Both ends of the first transmission shaft 13 are respectively fixed to the pitching pectoral fins. That is, a left end of the first transmission shaft 13 is connected to the left pectoral fin 17, and a right end of the first transmission shaft 13 is connected to the right pectoral fin 18. The left pectoral fin 17 and the right pectoral fin 18 rotate through the driving servo motor 11, the transmission gear set 12 and the first transmission shaft 13 to coordinate with the fast caudal propulsion of the bio-robotic flying fish, so as to adjust upward and downward motions of the bio-robotic flying fish in the water and a flying angle thereof in a water-air cross-medium transition process. The first bearing 14 is used to fix the first transmission shaft 13 and reduce friction during rotation. The dynamic sealing ring 15 is used for waterproof sealing during the rotation of the transmission shaft. The bearing fixing member 16 is used to prevent the first bearing 14 from moving axially.

Figure 3:
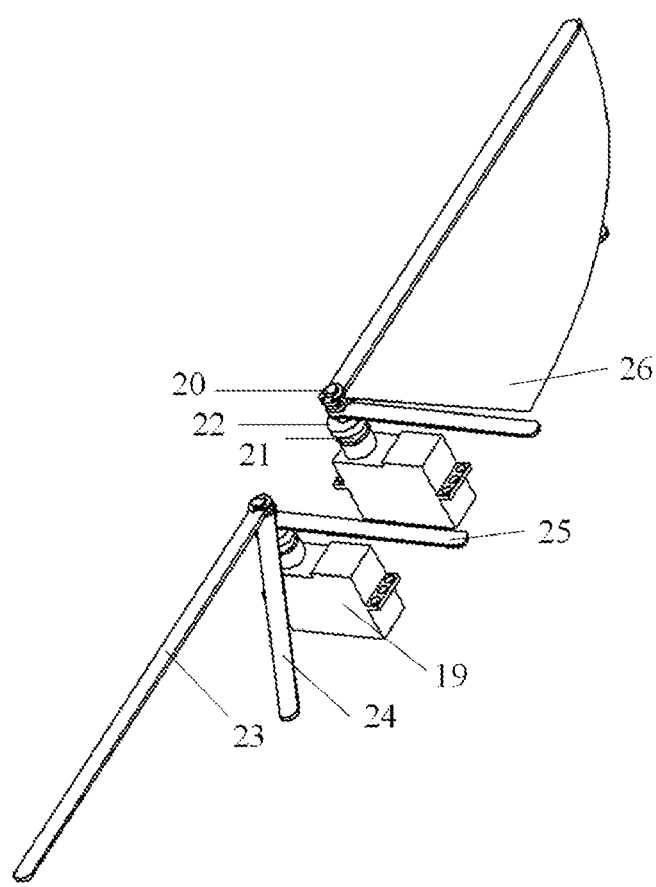
FIG. 3 is a schematic diagram showing a structure of variable-structure pectoral fins according to an embodiment of the present invention.

Referring to FIG. 3, the variable-structure pectoral fin module is composed of the driving servo motor 19, the second transmission shaft 20, the second bearing 21, the dynamic sealing ring 22, the leading edge fin ray 23, the median fin ray 24, the trailing edge fin ray 25 and the fin membrane 26. There are two variable-structure pectoral fins, which are symmetrically mounted on the left and right sides the body. The two variable-structure pectoral fins include two leading edge fin rays, two median fin rays, two trailing edge fin rays and two fin membranes. The trailing edge fin 25 is fixed to the body. The second transmission shaft is in transmission connection with the second power device. In an embodiment of the present invention, the second power device refers to the driving servo motor 19. The leading edge fin 23 rotates synchronously with the second transmission shaft 20 under the drive of the driving servo motor 19, so as to unfold or fold the fin membrane 26 fixed to the leading edge fin ray and the trailing edge fin ray. That is, the driving servo motor 19 drives the leading edge fin ray 23 and the median fin ray 24 to rotate through the second transmission shaft 20 to achieve the unfolding and folding functions of the variable-structure pectoral fin 5. The bearing 21 is used to fix the second transmission shaft 20. The dynamic sealing ring 22 is used for waterproof sealing during the rotation of the second transmission shaft 20.

Preferably, the leading edge fin rays 23, the median fin rays 24 and the trailing edge fin rays 25 are supported by a spring steel material, which has a high strength and elastic deformability.

Further, by taking the right variable-structure pectoral fin shown in FIG. 1 as an example, the process of folding and unfolding the pectoral fin according to an embodiment of the present invention is described in detail with reference to FIGS. 4 and 5.

Figure 4:
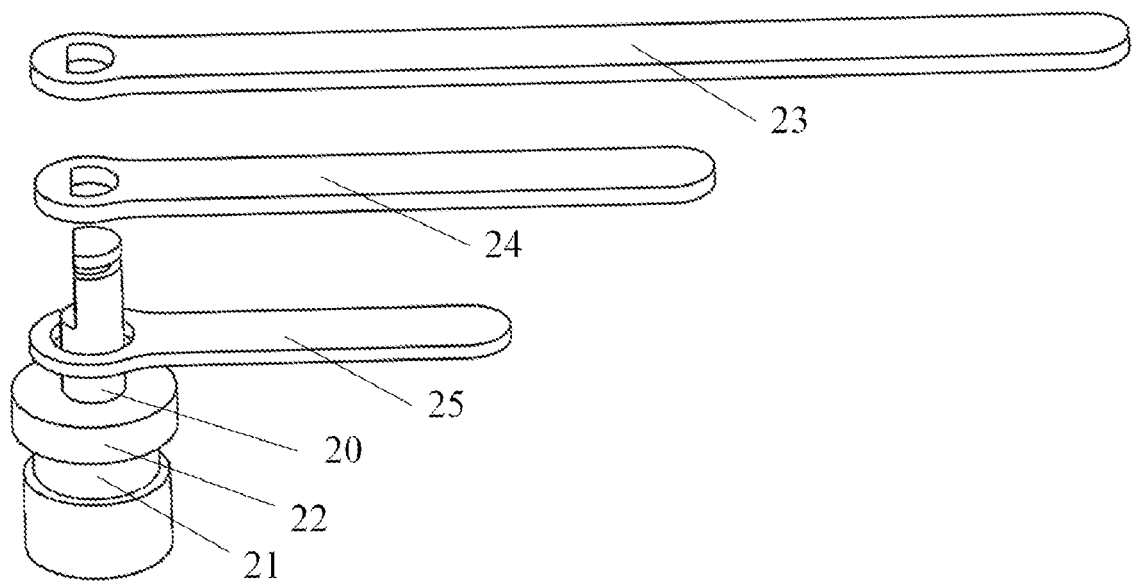
FIG. 4 is a schematic diagram showing a fully folded structure of one-sided pectoral fin of the variable-structure pectoral fins according to an embodiment of the present invention.

As shown in FIG. 4, when the variable-structure pectoral fin is fully folded, the leading edge fin ray 23, the median fin ray 24 and the trailing edge fin ray 25 are coaxially folded and are gathered in the groove of the body.

Figure 5:
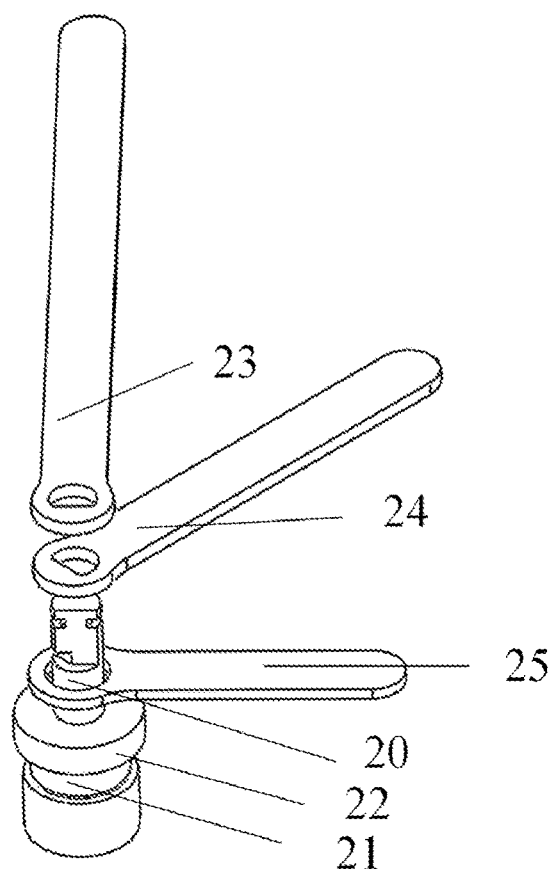
FIG. 5 is a schematic diagram showing a fully unfolded structure of one-sided pectoral fin of the variable-structure pectoral fins according to an embodiment of the present invention.

As shown in FIG. 5, when the variable-structure pectoral fin is fully unfolded, the leading edge fin ray 23, the median fin ray 24 and the trailing edge fin ray 25 move to a position shown in the figure so that the fin membrane is fully unfolded. The median fin ray 24 is provided with a D-shaped hole. The second transmission shaft 20 is provided with a sliding and rotating part in clearance fit with the D-shaped hole. The sliding and rotating part includes a planar zone and a cylindrical zone that are connected and sealed along the second transmission shaft. The sliding and rotating part is provided with an action groove. The action groove penetrates the planar zone and the cylindrical zone. A connection of the action groove and the cylindrical zone and a connection of the action groove and the planar zone are sequentially arranged along a rotation direction of the second transmission shaft. The sequential arrangement is to determine a position, that is, as shown in the figure, the action groove is provided on the left of the second transmission shaft.

An angle of the action groove is equal to an angle between the leading edge fin ray and the median fin ray when the fin membrane is fully unfolded. A line between the connection of the action groove and the planar zone and the connection of the action groove and the cylindrical zone is a first line. An angle of the action groove is an angle between the first line and the planar zone. That is, when the median fin ray 24 and the second transmission shaft 20 rotate in coordination, an angle (acute angle) between a projection line of the action groove provided on the second transmission shaft 20 and a horizontal line is consistent with that between projections of the leading edge fin ray 23 and the median fin ray 24 in a horizontal plane when the pectoral fin is fully unfolded. In the embodiment of the present invention, the angle is preferably 45°.

When the variable-structure pectoral fin changes from the fully folded state shown in FIG. 4 to the fully unfolded state shown in FIG. 5, the second transmission shaft 20 rotates counterclockwise. The leading edge fin ray 23 rotates counterclockwise synchronously with the second transmission shaft 20, and the trailing edge fin ray 25 is fixed to the body without rotating. After the median fin ray 24 and the second transmission shaft rotate relatively until a linear surface of the D-shaped hole of the median fin ray 24 is completely coordinated with the action groove of the second transmission shaft, the median fin ray 24 rotates synchronously with the second transmission shaft 20. That is, in the embodiment of the present invention, after the median fin ray 24 slides relative to the second transmission shaft, it rotates a fixed angle, while the leading edge fin ray 23 rotates 90° with the shaft.

Figure 6:
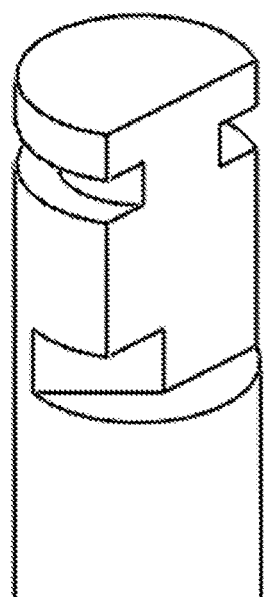
FIG. 6 is a partial enlarged view of an action groove of a second transmission shaft according to an embodiment of the present invention.

FIG. 6 is a partial enlarged view of the action groove of the second transmission shaft (right shaft). In an embodiment of the present invention, from top to bottom, a first groove (D-shaped groove) is assembled with a circlip to prevent the leading edge fin ray from being separated from the second transmission shaft in an axial direction. A portion of the second transmission shaft between the first groove and a second groove is a zone fully coordinated with the leading edge fin ray. An elastic retaining ring is preferably provided between the leading edge fin ray and the median fin ray. The elastic retaining ring is fixed below the leading edge fin ray to prevent the leading edge fin ray from sliding down to press the median fin ray. The second groove is an action groove for the median fin ray to coordinate with the second transmission shaft, that is, a sliding and rotating part. The D-shaped hole of the median fin ray is in the action groove; the median fin ray and the second transmission shaft first relatively slide and then fully coordinate to rotate. As shown in the figure, the sliding and rotating part is the second groove, where the median fin ray and the second transmission shaft act relative to each other. The action groove penetrates the planar zone (a plane of the D-shaped hole) and the cylindrical zone (a curved surface of the D-shaped hole). The connection between the action groove and the cylindrical zone (as shown in the figure, an intersection of the projection line of the action groove on the horizontal plane and a left side of the cylindrical zone) and a connection of the action groove and the planar zone (as shown in the figure, an intersection of the projection line of the action groove on the horizontal plane and a right side of the planar zone) are sequentially arranged along a rotation direction of the second transmission shaft. That is, when the second transmission shaft rotates counterclockwise, the action groove is arranged on the left side of the second transmission shaft (as shown in the figure). As known to those skilled in the art, the position of the action groove corresponds to the rotation direction of the transmission shaft, which will not be repeated here.

An angle of the action groove is equal to an angle between the leading edge fin ray and the median fin ray when the fin membrane is fully unfolded. A line between the connection (right projection intersection) of the action groove and the planar zone and the connection (left projection intersection) of the action groove and the cylindrical zone is a first line. An angle of the action groove is an angle between the first line and the planar zone (that is, an angle between the projection line of the action groove on the horizontal plane and the projection line of the planar zone of the D-shaped hole on the horizontal plane).

Preferably, the trailing edge fin ray 25 and the transmission shaft 20 are connected by a circular hole and are in clearance fit. The trailing edge fin ray does not rotate with the shaft, and is bonded on a plane of the groove of the body by an adhesive.

Preferably, the fin membrane 26 is made of an elastic membrane, which is bonded on the leading edge fin ray 23, the median fin ray 24 and the trailing edge fin ray 25 by an adhesive. As a fin surface of the variable-structure pectoral fins, the fin membrane provides lift for the bio-robotic flying fish to glide in the air.

As known to those skilled in the art, the angle between the leading edge fin ray 23 and the median fin ray 24 may be designed as needed, and is not limited to the embodiment of the present invention. The connection between the fin ray and the transmission shaft is not limited to the embodiment of the present invention, as long as it meets the motion requirement in the embodiment of the present invention.

Figure 7:
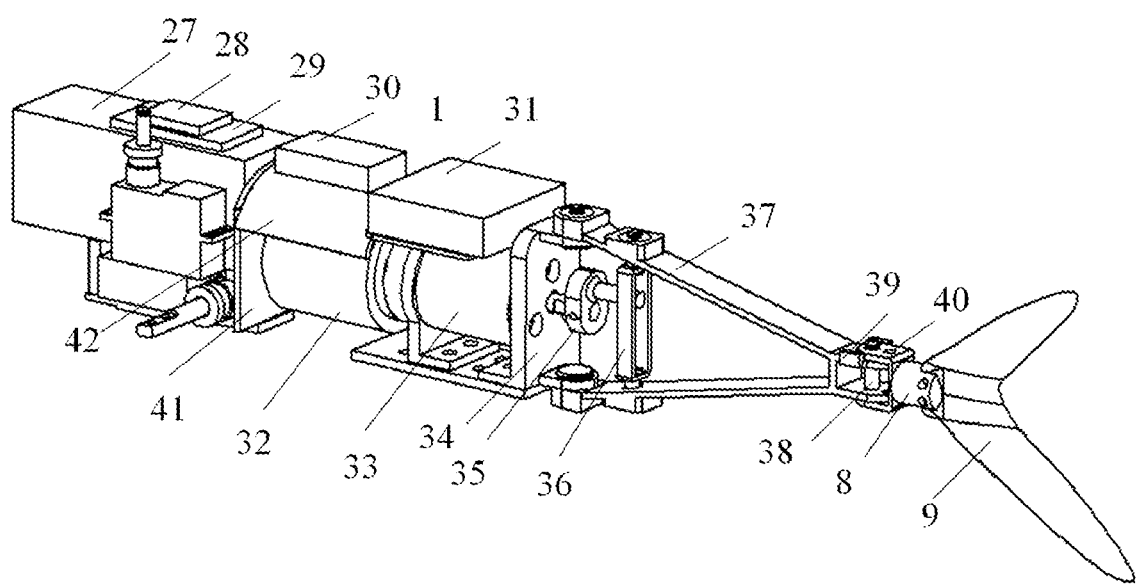
FIG. 7 is a schematic diagram showing a structure of a control system module and a caudal propulsion system according to an embodiment of the present invention.

Referring to FIG. 7, the caudal propulsion module of the water-air amphibious cross-medium bio-robotic flying fish includes the motor 32, the reduction gearbox 33, the fixing frame 34, the eccentric wheel 35, the sliding rail 36, the active link 37, the joint shaft 38, the caudal peduncle joint 8 and the caudal fin 9. The reduction gearbox 33 is fixedly connected to an output terminal of the third power device. In an embodiment of the present invention, the third power device refers to the motor 32. The eccentric wheel 35 is fixedly connected to an output terminal of the reduction gearbox 33. The motor 32 drives the reduction gearbox 33 and the eccentric wheel 35 to rotate. The active link 37 is hinged to the body. The sliding rail 36 is rotatably hinged to the active link 37 through the joint shaft 38, and is used to convert unidirectional continuous rotation of an output shaft of the reduction gearbox 33 into left-right reciprocating swing of the active link 37. The caudal fin is hinged to the active link. Alternatively, the caudal fin is fixed to the active link. The motor 32 is an outrunner brushless direct current motor. The motor 32 is isolated by the baffle 41 and the motor cover 42 to ensure the operational safety of the bio-robotic flying fish. The motor 32 is an outrunner brushless direct current motor with a high power density, which ensures high output power under the premise of small size and light weight. It meets the requirement of propelling the bio-robotic flying fish to swim quickly and leap out of water, as well as the requirements for lightweight and miniaturization. The motor 32 features fast speed and low output torque. By assembling the motor with the reduction gearbox 33, the output torque is greatly increased to achieve the high-frequency swing of the active link 37. The reduction gearbox 33 is fixed to the body cabin 1 by the fixing frame 34. The output shaft of the reduction gearbox is assembled with the eccentric wheel 35. The eccentric wheel 35 is connected to the sliding rail 36 to convert the fast unidirectional continuous rotation of the output shaft of the reduction gearbox 33 into fast left-right symmetrical reciprocating swing of the active link 37. This greatly improves the rotational efficiency of the motor 32 and achieves the fast caudal propulsion of the bio-robotic flying fish. The caudal peduncle joint 8 and the active link 37 are connected by the joint shaft 38. The caudal peduncle joint 8 and the caudal fin 9 are fixedly connected. Driven by the active link 37, the caudal fin 9 is able to passively swing left and right relative to the joint shaft 38. The limit baffle 39 is able to limit a maximum swing angle of the passive caudal fin. In an embodiment of the present invention, the left-right swing angle of the caudal fin is in a range of −40° to 40° on both sides of an axis of the body. As known to those skilled in the art, the position of the limit baffle may be set according to an actual need to plan the left-right swing angle of the caudal fin. When the caudal fin and the active link are fixedly connected, that is, when the caudal peduncle joint 8 is fixed at the threaded hole 40 by a screw, the bio-robotic flying fish becomes a single-joint propulsion structure. By changing a diameter of the eccentric wheel 35 and the position of the limit baffle 39, a swing amplitude of the active link 37 and a swing angle of the caudal peduncle joint 8 are respectively adjusted, so as to achieve the optimal propulsion performance of the bio-robotic flying fish. The water-air amphibious cross-medium bio-robotic flying fish further includes a waterproof caudal skin. The waterproof caudal skin covers a caudal end of the body. The waterproof caudal skin is preferably made of latex rubber, which has good flexibility and waterproof performance. The waterproof caudal skin and the fish body are sealed and connected by a sealant to achieve a waterproof caudal end of the bio-robotic flying fish and meet the requirements of the bio-robotic flying fish for underwater motion.

The water-air amphibious cross-medium bio-robotic flying fish further includes an action rod. The eccentric wheel 35 is rotatably mounted in a plane perpendicular to a length direction of the water-air amphibious cross-medium bio-robotic flying fish. The action rod is fixed to the eccentric wheel and keeps a distance from a rotation axis of the eccentric wheel. The sliding rail 36 includes two action parts. The two action parts are symmetrically arranged on the left and right sides of the body. A distance from a free end of the action rod to the eccentric wheel is greater than a distance from a side of each of two the action parts facing the eccentric wheel to the eccentric wheel. The action rod is an action member for the eccentric wheel and the sliding rail. Preferably, a length of the action rod ensures that the action rod is inside the sliding rail. When the eccentric wheel rotates circumferentially, the action rod rotates under the drive of the eccentric wheel. The action rod is restricted by the two action parts of the sliding rail, and moves up and down in the sliding rail. The action end does both circumferential motion and linear motion. That is, the sliding rail converts the fast unidirectional continuous rotation of the output shaft of the reduction gearbox into the fast left-right reciprocating swing of the active link.

The active link includes two action parts. The two action parts are fixedly connected in a V-shape. A limit baffle is provided at a connecting end of the two action parts the active link. The limit baffle is used to limit a maximum swing angle of the caudal fin. The active link is preferably structured as shown in FIG. 6, which greatly reduces the resistance of the bio-robotic flying fish in the water, and has the advantages of light weight, material saving and cost reduction.

The water-air amphibious cross-medium bio-robotic flying fish further includes a control system module. The control system module includes the lithium battery 27, the gyroscope 28, the communication module 29, the motor drive module 30 and the control module 31. The control module 31 and the motor drive module 30 are powered by the lithium battery 27. The control module 31 communicates with a host computer through the communication module 29. That is, the communication module communicates with the outside, and is used to send a motion state of the water-air amphibious cross-medium bio-robotic flying fish (posture information of the bio-robotic flying fish acquired by the gyroscope 28), or to receive instructions of different swimming modes from the outside. The communication module further receives control instructions sent by the host computer to drive and control the motor 32, the driving servo motor 11 and the driving servo motor 19, so as to achieve the corresponding swimming modes.

The controller controls the rotation of the two pitching pectoral fins, the folding or unfolding of the variable-structure pectoral fins and the swing of the active link to implement three working modes of the water-air amphibious cross-medium bio-robotic flying fish, that is, underwater high-speed and high-maneuverability motion, water-air cross-medium transition motion and air gliding motion.

In the underwater high-speed and high-maneuverability motion mode, the third power device acts as a caudal propulsion mechanism to drive the caudal fin to make left-right reciprocating swing, so as to provide power for the water-air amphibious cross-medium bio-robotic flying fish to move forwards. A swing frequency of the active link is controlled to adjust a speed of the bio-robotic flying fish moving forwards. The rotation of the pitching pectoral fins is controlled to achieve upward and downward motions of the water-air amphibious cross-medium bio-robotic flying fish in the water. The variable-structure pectoral fins are folded on both sides of the body.

In the water-air cross-medium transition motion mode, the water-air amphibious cross-medium bio-robotic flying fish leaps out of the water surface by controlling the pitch angle of the pitching pectoral fins and cooperating with the fast swing of the active link. After the variable-structure pectoral fins leave the water surface, the variable-structure pectoral fins are quickly unfolded.

In the air gliding motion mode, after the water-air amphibious cross-medium bio-robotic flying fish leaps out of the water surface, the unfolded variable-structure pectoral fins provide lift to achieve an air gliding motion. An angle of unfolding the variable-structure pectoral fins is controlled to adjust a gliding posture of the bio-robotic flying fish. When the variable-structure pectoral fins are fully folded in the air, a fast splash-down diving motion may be achieved. The bio-robotic flying fish is designed based on the ideas of lightweight and miniaturization to achieve better swimming performance, reduce the difficulty of water-air cross-medium transition and achieve better air gliding performance.

According to the above technical solutions, the bio-robotic flying fish of the present invention can achieve water-air amphibious cross-medium motions, that is, high-speed underwater motion and air gliding motion. The bio-robotic flying fish has an excellent ability to achieve water-air amphibious cross-medium motions of biological flying fish, and adapts to the requirements of different tasks by switching between different navigation media. In the water environment, the bio-robotic flying fish swims fast with high maneuverability through swing-tail bionic propulsion, which is suitable for performing tasks in the complex underwater environment. The pitching pectoral fins act as control wings, and their pitch angle can be changed to achieve upward and downward motions of the bio-robotic flying fish in the underwater environment. This method has the advantages of fast adjustment speed, large adjustment range and small space occupation. Through the coordination of the fast caudal propulsion and the pitching pectoral fins of the bio-robotic flying fish, the bio-robotic flying fish can leap out of water to achieve the water-air cross-medium transition, so as to enter the air to perform tasks. In the air, the unfolded variable-structure pectoral fins provide lift for the bio-robotic flying fish to glide, which improves the motion efficiency and is suitable for performing tasks in the air. The present invention adopts a miniaturized and lightweight design in the overall design process, so that the bio-robotic flying fish can more easily achieve the water-air cross-medium transition and reach a longer gliding distance. The present invention effectively solves the problems of poor underwater motion performance, large disturbance, low propulsion efficiency and long cross-medium transition time in the prior art.

It should be noted that in the description of the present invention, terms such as "central", "upper", "lower", "left", "right", "vertical", "horizontal", "inner" and "outer" indicate orientation or position relationships based on the accompanying drawings. The above terms are merely intended to facilitate description, rather than to indicate or imply that the mentioned device or components must have the specific orientation and must be constructed and operated in the specific orientation. Therefore, these terms should not be construed as a limitation to the present invention. Moreover, the terms such as "first", "second" and "third" are used only for the purpose of description and are not intended to indicate or imply relative importance.

It should be noted that in the description of the present invention, unless otherwise clearly specified, meanings of terms "mount", "connect with" and "connect to" should be understood in a broad sense. For example, the connection may be a fixed connection, a removable connection, or an integral connection; may be a mechanical connection or an electrical connection; may be a direct connection or an indirect connection via a medium; or may be an internal connection between two components. Those skilled in the art should understand the specific meanings of the above terms in the present invention based on specific situations.

In addition, terms "include", "comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

The technical solutions of the present invention are described with reference to the preferred embodiments and accompanying drawings. Those skilled in the art should easily understand that the protection scope of the present invention is apparently not limited to these specific embodiments. Those skilled in the art can make equivalent changes or substitutions to the relevant technical features without departing from the principles of the present invention, and the technical solutions after these changes or substitutions should fall within the protection scope of the present invention.

What is claimed is:

1. A water-air amphibious cross-medium bio-robotic flying fish, comprising a body, pitching pectoral fins, variable-structure pectoral fins, a caudal propulsion module, a sensor module and a controller, wherein there are two pitching pectoral fins; the two pitching pectoral fins are symmetrically arranged on left and right sides of the body; the two pitching pectoral fins are rotatably mounted on the body around a left-right axis under a drive of a first power device;

there are two variable-structure pectoral fins; the two variable-structure pectoral fins are symmetrically arranged on the left and right sides of the body; the two variable-structure pectoral fins are foldably mounted on the body along a front-back direction under a drive of a second power device; each of the two variable-structure pectoral fins comprises a leading edge fin ray, a median fin ray, a trailing edge fin ray, a fin membrane and a fin ray transmission shaft; wherein the leading edge fin ray is fixedly mounted on the fin ray transmission shaft; the trailing edge fin ray is fixed to the body; the median fin ray is provided with a D-shaped hole, the fin ray transmission shaft is provided with a sliding and rotating part, and the sliding and rotating part is in clearance fit with the D-shaped hole; in a driving process of the second power device, the fin ray transmission shaft drives the leading edge fin ray to rotate outwards, and the median fin ray slides relative to the fin ray transmission shaft through the sliding and rotating part until the corresponding D-shaped hole is engaged and rotates synchronously;

the caudal propulsion module is mounted at a rear of the water-air amphibious cross-medium bio-robotic flying fish;

the sensor module is mounted on the body, and the sensor module is configured to detect at least one of the following: an attitude of the body, a rotation angle of the two pitching pectoral fins, a depth of the water-air amphibious cross-medium bio-robotic flying fish in a water environment and a gliding height of the water-air amphibious cross-medium bio-robotic flying fish in the air, an unfolded/folded state of the two variable-structure pectoral fins, a swing frequency of the caudal propulsion module and an ambient environment of the body; and a signal output terminal of the sensor module, a control terminal of the first power device, and a control terminal of the second power device are respectively signal-connected to the controller.

2. The water-air amphibious cross-medium bio-robotic flying fish according to claim 1, wherein the first power device drives the two pitching pectoral fins to rotate through a first transmission mechanism; the first transmission mechanism comprises a driving gear, a driven gear, a bearing and a first transmission shaft; a power output terminal of the first power device is in transmission connection with the driving gear; the driving gear and the driven gear are rotatably mounted on the body and the driving gear and the driven gear are meshed; the first transmission shaft and the driven gear are coaxially fixedly connected; the first transmission shaft is rotatably mounted on the body through the bearing; and both ends of the first transmission shaft are respectively fixedly connected to the two pitching pectoral fins.

3. The water-air amphibious cross-medium bio-robotic flying fish according to claim 1, wherein the fin ray transmission shaft is in transmission connection with the second power device;

the sliding and rotating part comprises a planar zone and a cylindrical zone connected and sealed along the fin ray transmission shaft; the sliding and rotating part is provided with an action groove; the action groove penetrates the planar zone and the cylindrical zone;

a connection of the action groove and the cylindrical zone and a connection of the action groove and the planar zone are sequentially arranged along a rotation direction of the fin ray transmission shaft;

an angle of the action groove is equal to an angle between the leading edge fin ray and the median fin ray when the fin membrane is fully unfolded; a line between the connection of the action groove and the planar zone and the connection of the action groove and the cylindrical zone is a first line; the angle of the action groove is an angle between the first line and the planar zone;

there are two fin membranes; the two fin membranes are symmetrically arranged on the left and right sides of the body; and each of the fin membranes is fixedly connected to the leading edge fin ray, the median fin ray and the trailing edge fin ray.

4. The water-air amphibious cross-medium bio-robotic flying fish according to claim 1, further comprising the caudal propulsion module, an eccentric wheel and a sliding rail; wherein the caudal propulsion module comprises a caudal drive module and a caudal module; wherein the caudal drive module comprises a third power device and a reduction gearbox; the reduction gearbox is fixedly connected to an output terminal of the third power device; the eccentric wheel is fixedly connected to an output terminal of the reduction gearbox; the third power device drives the reduction gearbox and the eccentric wheel to rotate;

the caudal module comprises an active link and a caudal fin; the active link is hinged to the body; the sliding rail is hinged to the active link, and the sliding rail is configured to convert a unidirectional continuous rotation of an output shaft of the reduction gearbox into a left-right reciprocating swing of the active link; the caudal fin is hinged to the active link; alternatively, the caudal fin is fixed to the active link.

5. The water-air amphibious cross-medium bio-robotic flying fish according to claim 4, further comprising an action rod, wherein the eccentric wheel is rotatably mounted in a plane perpendicular to a length direction of the water-air amphibious cross-medium bio-robotic flying fish; the action rod is fixed to the eccentric wheel and keeps a distance from a rotation axis of the eccentric wheel;

the sliding rail comprises two action parts; the two action parts are symmetrically arranged on the left and right sides of the body; and a distance from a free end of the action rod to the eccentric wheel is greater than a distance from a side of each of two the action parts facing the eccentric wheel to the eccentric wheel.

6. The water-air amphibious cross-medium bio-robotic flying fish according to claim 5, wherein the controller controls a rotation of the two pitching pectoral fins, a folding or unfolding of the two variable-structure pectoral fins and a swing frequency of the active link to implement three working modes of the water-air amphibious cross-medium bio-robotic flying fish, and the three working modes comprise an underwater high-speed and high-maneuverability motion mode, a water-air cross-medium transition motion mode and an air gliding motion mode; wherein in the underwater high-speed and high-maneuverability motion mode, the third power device acts as a caudal propulsion mechanism to drive the active link and the caudal fin to make a left-right reciprocating swing, to provide power for the water-air amphibious cross-medium bio-robotic flying fish to move forwards; a swing frequency of the active link is controlled to adjust a forward speed of the water-air amphibious cross-medium bio-robotic flying fish; the first power device controls, by using the first transmission mechanism, the two pitching pectoral fins to move, and controls a pitch angle of the two pitching pectoral fins to achieve upward and downward motions in the water, wherein the two variable-structure pectoral fins are folded on both sides of the body;

in the water-air cross-medium transition motion mode, the water-air amphibious cross-medium bio-robotic flying fish leaps out of a water surface by controlling the pitch angle of the two pitching pectoral fins and cooperating with a fast swing of the active link; after the two variable-structure pectoral fins leave the water surface, the two variable-structure pectoral fins are quickly unfolded;

in the air gliding motion mode, after the water-air amphibious cross-medium bio-robotic flying fish leaps out of the water surface, unfolded variable-structure pectoral fins provide lift to achieve an air gliding motion; an angle of unfolding the two variable-structure pectoral fins is controlled to adjust a gliding posture of the water-air amphibious cross-medium bio-robotic flying fish; when the two variable-structure pectoral fins are fully folded in the air, a fast splash-down diving motion is achieved.

7. The water-air amphibious cross-medium bio-robotic flying fish according to claim 4, wherein the active link comprises two action parts; the two action parts are fixedly connected in a V-shape; a limit baffle is provided at a tail end of a connecting end of the two action parts of the active link; the limit baffle is configured to adjust a maximum swing angle of the caudal fin to coordinate with a swing angle of the active link, to achieve optimal swimming performance.

8. The water-air amphibious cross-medium bio-robotic flying fish according to claim 7, wherein the controller controls a rotation of the two pitching pectoral fins, a folding or unfolding of the two variable-structure pectoral fins and a swing of the active link to implement three working modes of the water-air amphibious cross-medium bio-robotic flying fish, and the three working modes comprise an underwater high-speed and high-maneuverability motion mode, a water-air cross-medium transition motion mode and an air gliding motion mode; wherein in the underwater high-speed and high-maneuverability motion mode, the third power device acts as a caudal propulsion mechanism to drive the active link and the caudal fin to make a left-right reciprocating swing, to provide power for the water-air amphibious cross-medium bio-robotic flying fish to move forwards; a swing frequency of the active link is controlled to adjust a forward speed of the water-air amphibious cross-medium bio-robotic flying fish; the first power device controls, by using the first transmission mechanism, the two pitching pectoral fins to move, and controls a pitch angle of the two pitching pectoral fins to achieve upward and downward motions in the water, wherein the two variable-structure pectoral fins are folded on both sides of the body;

in the water-air cross-medium transition motion mode, the water-air amphibious cross-medium bio-robotic flying fish leaps out of a water surface by controlling the pitch angle of the two pitching pectoral fins and cooperating with a fast swing of the active link; after the two variable-structure pectoral fins leave the water surface, the two variable-structure pectoral fins are quickly unfolded;

in the air gliding motion mode, after the water-air amphibious cross-medium bio-robotic flying fish leaps out of the water surface, unfolded variable-structure pectoral fins provide lift to achieve an air gliding motion; an angle of unfolding the two variable-structure pectoral fins is controlled to adjust a gliding posture of the water-air amphibious cross-medium bio-robotic flying fish; when the two variable-structure pectoral fins are fully folded in the air, a fast splash-down diving motion is achieved.

9. The water-air amphibious cross-medium bio-robotic flying fish according to claim 1, further comprising a communication module; wherein the communication module is in communication connection with the outside, and the communication module is configured to send motion state information of the water-air amphibious cross-medium bio-robotic flying fish and receive a control instruction sent from the outside.

10. The water-air amphibious cross-medium bio-robotic flying fish according to claim 1, further comprising a waterproof caudal skin; wherein the waterproof caudal skin covers a posterior of the body and the waterproof caudal skin is configured for a waterproof sealing of the water-air amphibious cross-medium bio-robotic flying fish.

* * * * *